Jan. 10, 1950     T. G. HILL     2,494,093

FISH LURE

Filed March 29, 1948

INVENTOR

T. Gardner Hill

Patented Jan. 10, 1950

2,494,093

UNITED STATES PATENT OFFICE 2,494,093

FISH LURE

Thomas Gardner Hill, Round Bay, Md.

Application March 29, 1948, Serial No. 17,660

1 Claim. (Cl. 43—42.48)

My invention relates to fish lures and the primary object is to provide an improved fish lure which is particularly adapted to casting and trolling.

A feature of the invention resides in the composition of the lure body which is a cylinder truncated acutely by two planes in such a manner that the combined outline of the cylinder and the surfaces of truncation simulates the outline of a fish body and the surfaces of truncation impart an irregular darting motion to the lure when it is dragged through the water.

Figure 1:
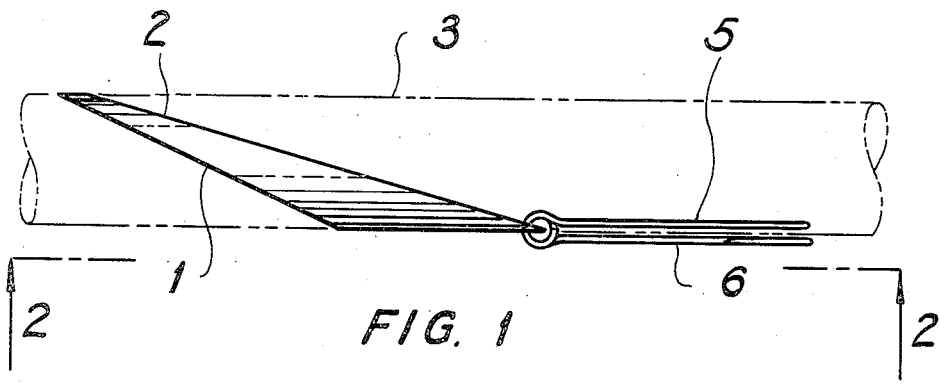
Figure 2:
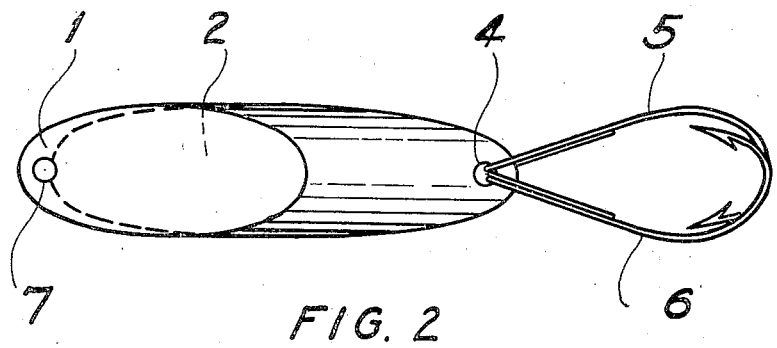

One form of the invention is illustrated in the accompanying drawing in which Figure 1 is a plan view of the lure and Figure 2 is a side elevation view of the device shown in Figure 1. Similar numerals refer to similar parts in both views.

The body of the lure is formed by truncating a cylinder 3 with two acutely angled planes 1 and 2 of such proximity to each other that the distance between them measured along the axis of the cylinder is less than the transverse dimension of the cylinder. It will be observed from Figure 2 that this results in an outline simulating the shape of a fish body. This arrangement of plane surfaces also imparts a dynamic instability to the lure body when dragged through the water giving it a fish-like darting action.

The body of the lure is provided with hole 7 at the forward end for the attachment of a fishing line and hole 4 at the aft end for the attachment of hooks 5 and 6.

I am aware that prior to my invention fish lures have been made with bodies which are truncated cylinders. I therefore do not claim such an arrangement broadly; but I claim:

A fish lure comprising a body which is a cylinder terminating in two substantially plane surfaces of truncation at least one of which surfaces forms an angle of less than forty-five degrees with the axis of the cylinder and the distance between said surfaces measured along the axis of the cylinder is less than the maximum transverse dimension of the cylinder, a hook secured to the lure body, and a means provided for the attachment of a line to the lure body.

THOMAS GARDNER HILL.

REFERENCES CITED

The following references are of record in the file of this patent:

UNITED STATES PATENTS

| Number | Name | Date |
|---|---|---|
| D. 142,160 | Baldwin | Aug. 14, 1945 |
| 1,653,400 | Jeffries | Dec. 20, 1927 |
| 1,710,908 | Vereecken | Apr. 30, 1929 |